Dec. 28, 1948.                H. J. BUTLER                2,457,344
                         FLUID PRESSURE BRAKE APPARATUS
Filed June 1, 1945                                   3 Sheets-Sheet 1

Dec. 28, 1948.  H. J. BUTLER  2,457,344
FLUID PRESSURE BRAKE APPARATUS
Filed June 1, 1945  3 Sheets-Sheet 3
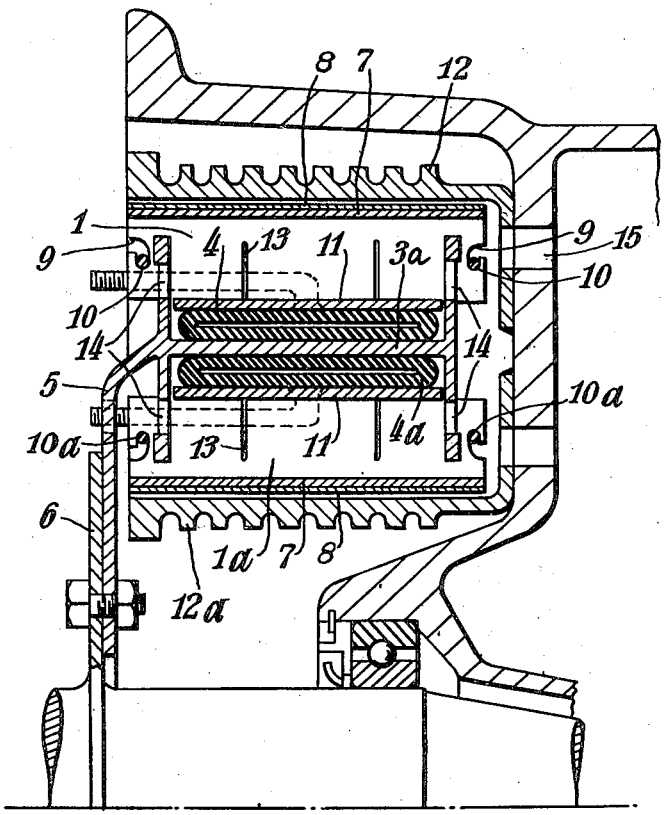

UNITED STATES PATENT OFFICE 2,457,344

FLUID PRESSURE BRAKE APPARATUS

Henry James Butler, Sutton Coldfield, England, assignor to Dunlop Rubber Company Limited, County of London, England, a British company Application June 1, 1945, Serial No. 597,121
In Great Britain June 3, 1944

7 Claims. (Cl. 188—152)

My invention relates to improvements in or concerning brake apparatus of the type having friction elements movable radially by distensible means relative to an annular support of channel section and particularly relates to brake apparatus of the above type for aircraft wheels in its application to which the invention is now particularly described.

The invention has for its object to provide brake and like apparatus of the above kind in which the friction elements are supported so as more readily to accommodate themselves to the brake drum, and to facilitate the removal of such elements collectively in ring formation from the annular support.

According to this invention wheel brake and like apparatus of the type having friction elements movable radially by distensible means relative to an annular support comprises members interposed between the said distensible means and said friction elements, said interposed members having substantially flat portions on which said friction elements are mounted and web portions adapted to transmit pressure to said flat portions from said distensible means.

Preferably the web portions of the interposed members are connected together circumferentially by spring rings, and are provided with radial slits adapted to impart flexibility to said web portions which may be insulated from the distensible means by segments of heat resisting material disposed between said web portions and said distensible means.

In order that the invention may be more readily understood and carried into effect the same will now be described with reference to the accompanying drawings in which:

Fig. 3 is a part sectional end view of an aircraft wheel provided with a modified form of brake apparatus constructed in accordance with the invention.

Figure 2:
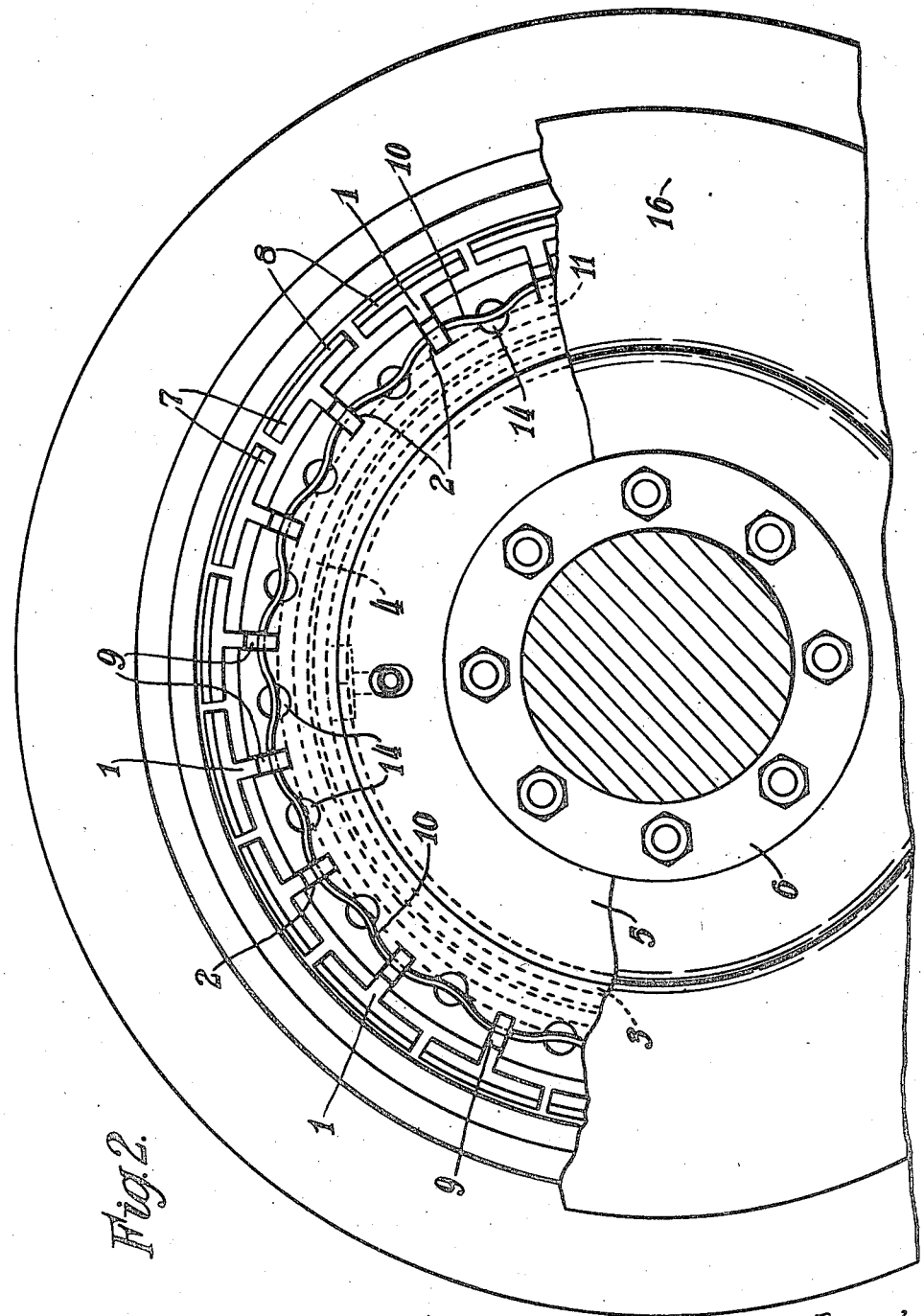
Fig. 2 is a side view of the wheel shown in Fig. 1, with a portion of the air deflecting disc 16 broken away.

Referring to the drawings a convenient embodiment of the invention as applied to an aircraft wheel comprises a series of separately formed members which may be of a T shaped cross-section as shown in the drawings. The legs 1 of these members constitute reinforcing webs located in radial slots 2 Fig. 2 provided in an annular support 3 of channel section, said support carrying distensible means in the form of a hollow rubber or metal annulus 4 distensible by fluid under pressure and being attached to a torque disc 5 secured to the permanent hub 6 of the wheel.

Figure 1:
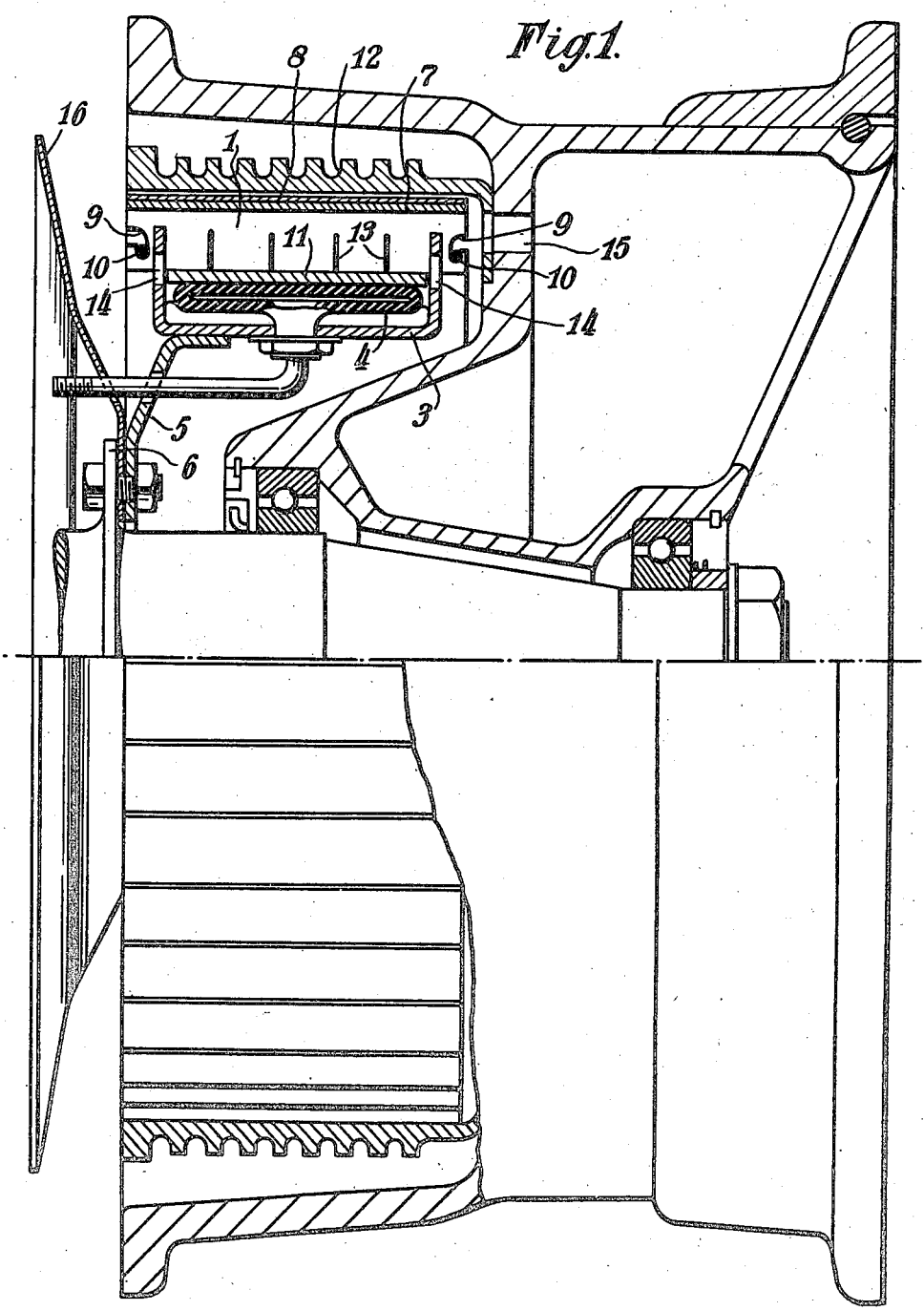
Fig. 1 is a part sectional end view of an aircraft wheel provided with brake apparatus constructed in accordance with the invention.

The substantially flat heads 7 of the interposed shaped members are each provided with braking elements 8 which may consist of sintered metal, and the webs 1 of each of such members with two slots 9 Fig. 1 spaced apart adjacent the opposed walls of the supports 3 in which slots are lodged two circumferentially extending spring-rings 10. Between the webs of the T shaped members and the distensible means may be interposed a segmental band 11 of heat resistant material adapted to insulate the distensible means from the heat generated by contact of the friction elements with the brake drum 12 and imparted to the T shaped members. This band may be constructed as shown in Butler Patent 2,392,225, January 1, 1946.

Each spring-ring 10 may be of an undulatory form capable of resilient extension circumferentially when the distensible element is inflated to allow the series of T shaped members and braking elements to be expanded radially outwards into contact with the brake drum of the wheel, and to effect their withdrawal radially to their inoperative position on deflection of the distensible means. The spring-rings also serve axially to locate the T shaped members in relation to the annular support.

As shown in Fig. 3 the invention may also be applied to wheels having dual coaxial brake drums 12 and 12a. In this type of brake wheel an annular support 3a of a double channel or H shaped cross-section is positioned between such drums by a torque disc 5 secured peripherally to one wall of the annular support and at its centre to the permanent hub 6 of the wheel. The walls of the double channel support are provided at their outer and inner peripheries with radial slots 2 adapted to register with the transversely extending webs of two series of T shaped members 1 and 1a. The webs of the T shaped members disposed in the outer channel of the annular support are connected by a pair of spring-rings 10 whereby the outer ring of such members and their braking elements are movable radially outwards against spring load by a means distensible between their webs and the axially extending portion of the support. The T shaped members located in the inner channel are resiliently positioned by a further pair of spring-rings 10a adapted to be contracted in diameter by the inflation of a second element 4a distensible within the inner channel of the annular support and the webs of the inner series of T shaped members. The webs of such members may be radially slotted at 13 to impart transverse flexibility particularly when contacted by distensible means disposed side by side.

The walls of the annular support may be provided with apertures 14 for cooling purposes, such apertures being conveniently disposed between the radial slots in which the T shaped members are seated and adjacent apertures 15 in the wheel body. Circulation of air between the web portions 1 and through the apertures 14, 15 may be induced by an air deflecting disc 16 Figs. 1 and 2, secured to the permanent hub, the periphery of said disc being inclined outwardly from the permanent hub to direct a current of air through the wheel during forward movement of the wheel, and to induce extraction of heated air from those apertures momentarily behind the trailing edge of the disc.

Having described my invention what I claim is:

1. Wheel brake apparatus which comprises a pair of concentric spaced brake drums, a stationary cylindrical support between said brake drums, expansible annular tubes on opposite sides of said stationary cylinder, pressure transmitting members between said tubes and said brake drums arranged in a pair of concentric annular series between their respective annular tubes and said brake drums, each of said members having a radial flange set edgewise relative to one of said annular tubes and extending toward its respective brake drum and having a flat surface opposed to the surface of said brake drum, a friction plate on said flat surface, means to hold said members from rotating relative to said stationary cylinder and spring rings to hold said members against their respective annular tubes.

2. Brake apparatus which comprises an annular support, a pair of distensible means mounted on the inner and outer faces of said annular support, a pair of coaxial series of members, one on the inner and one on the outer surface of said annular support, each of said members comprising a plate spaced from said annular support and having a web extending in a radial plane toward said annular support, the webs of one series being opposed to those of the others, each said member having a friction member on the surface farther from said annular support.

3. Wheel brake apparatus which comprises a permanent hub having an annular support of channel section the flanges of said channel extending outwardly, an annular expansible tube on said annular support between the flanges thereof, heat resistant means on the outer surface of said expansible tube, pressure transmitting members of T-section mounted in circumferential series about said expansible tube, each pressure transmitting member having a face spaced from said heat resisting means and having a web in a plane radial to said annular support and extending to said heat resisting means, spring rings to press said pressure transmitting members centrally inwardly and friction elements on the outer faces of said elements.

4. The wheel brake apparatus of claim 3 having a brake drum enclosing said friction element.

5. Brake apparatus which comprises an annular support, a distensible means mounted on said support, a segmental band of heat resistant material encircling said distensible means, members on said distensible means arranged in circumferential series thereon, each said member comprising a plate spaced from said annular support and having a web extending therefrom in a radial plane edgewise to and supported on said segmental band, a friction member on the face of said plate opposite said web and spring rings connecting the webs of said members together circumferentially.

6. Brake apparatus which comprises an annular support, a distensible means mounted on said support, a segmental band of heat resistant material encircling said distensible means, members on said distensible means arranged in circumferential series thereon, each said member comprising a plate spaced from said annular support and having a web extending therefrom in a radial plane edgewise to and supported on said segmental band, a friction member on the face of said plate opposite said web and spring rings connecting the webs of said members together circumferentially.

7. Brake apparatus which comprises an annular support, a distensible means mounted on said support, a segmental band of heat resistant material encircling said distensible means, members on said distensible means arranged in circumferential series thereon, each said member comprising a plate spaced from said annular support and having a web extending therefrom in a radial plane edgewise to and supported on said segmental band, a friction member on the face of said plate opposite said web, and said annular support having an air deflecting disk inclined outwardly from said support.

HENRY JAMES BUTLER.

REFERENCES CITED

The following references are of record in the file of this patent:

UNITED STATES PATENTS

| Number | Name | Date |
|---|---|---|
| 1,707,272 | Livingston | Apr. 2, 1929 |
| 1,917,671 | Stahl | July 11, 1933 |
| 2,174,724 | Hunter | Oct. 3, 1939 |
| 2,392,225 | Butler | Jan. 1, 1946 |
| 2,406,543 | Hunter | Aug. 27, 1946 |